United States Patent [19]
Hunsucker

[11] 3,843,607
[45] Oct. 22, 1974

[54] BAKING ENAMEL VEHICLE COMPRISING REACTION PRODUCT OF UREA, FORMALDEHYDE AND AN OXAZOLINE

[75] Inventor: Jerry H. Hunsucker, Terre Haute, Ind.

[73] Assignee: Commercial Solvents Corporation, Terre Haute, Ind.

[22] Filed: May 21, 1973

[21] Appl. No.: 362,594

Related U.S. Application Data

[60] Continuation-in-part of Ser. No. 185,406, Sept. 30, 1971, abandoned, which is a division of Ser. No. 36,680, May 12, 1970, Pat. No. 3,654,229.

[52] U.S. Cl. ............ 260/70 R, 260/70 A, 260/70 M
[51] Int. Cl. .......................... C08g 9/10, C08g 9/24
[58] Field of Search ............... 260/70 R, 67.5, 70 A

[56] References Cited
UNITED STATES PATENTS

| | | | |
|---|---|---|---|
| 2,524,112 | 10/1950 | LaPiana et al. | 260/67.6 |
| 3,423,349 | 1/1969 | Gagliardi | 260/29.4 R |
| 3,464,946 | 9/1969 | Downing | 260/29.4 |
| 3,523,123 | 8/1970 | Wehrmeister | 260/307 F |
| 3,654,229 | 4/1972 | Hunsucker | 260/67.6 |

*Primary Examiner*—Howard E. Schain
*Attorney, Agent, or Firm*—Robert H. Dewey; Howard E. Post

[57] ABSTRACT

An improved vehicle for the formulation of baking enamels obtained by reacting an oxazoline with formaldehyde and urea or with an alkylated urea-formaldehyde resin, or with a mixture of urea-formaldehyde resin and dimethylolpropionic acid.

14 Claims, No Drawings

BAKING ENAMEL VEHICLE COMPRISING REACTION PRODUCT OF UREA, FORMALDEHYDE AND AN OXAZOLINE

CROSS-REFERENCE TO RELATED APPLICATIONS

This application is a continuation-in-part of copending application Ser. No. 185,406, filed Sept. 30, 1971, now abandoned, which was a division of application Ser. No. 36,680, filed May 12, 1970, now U.S. Pat. No. 3,654,229, subject matter of which is incorporated herein by reference.

BACKGROUND OF THE INVENTION

This invention relates to an improved vehicle for baking enamels. In a particular aspect, it relates to improved vehicles derived from oxazolines.

It is known from Purcell, U.S. Pat. No. 3,248,397, to prepare drying oils from 2-ethenyl oxazolines by copolymerizing them with olefinic or diolefinic monomers. These drying oils are useful as vehicles in protective coatings and finishes based on them have received wide acceptance. However, the protective coatings industry is ever in need of improved finishes, particularly baking enamels intended for use on steel. Particularly desirable are vehicles possessing corrosion resistance, good adhesion, hardness without loss of flexibility, and relatively colorless so as not to interfere with pigmentation of light-colored finishes.

A baking enamel is understood to be a partially polymerized resinous compound, usually dispersed in an organic solvent and formulated with pigments and other additives, which, when applied to a substratum and heated, polymerizes completely to form a tough, hard, adherent, flexible protective coating on the substratum.

SUMMARY OF THE INVENTION

It is an object of this invention to provide improved vehicles for baking enamels.

Another object of this invention is to provide baking enamels based upon oxazoline co-polymers and ter-polymers.

Other objects of this invention will be apparent to those skilled in the art from the disclosure herein.

It is the discovery of the present invention to provide polymeric resinous compounds having especial utility as the vehicle in the formulation of baking enamels. The resins of the present invention are condensation products of (a) an oxazoline compound corresponding to formula I:

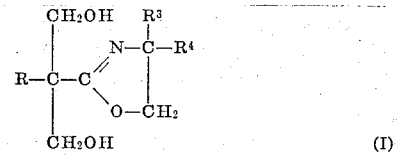

(I)

or (b) an oxazoline corresponding to formual II:

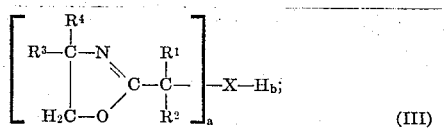

(III)

with the following Group A: (1) formaldehyde and urea, or (2) alkylated urea-formaldehyde resin, or (3) mixtures of alkylated urea-formaldehyde resin and 2,2-dimethylolpropionic acid. $R^1$ and $R^2$ are hydrogen or hydroxymethyl; $R^3$ and $R^4$ are methyl, ethyl, hydroxymethyl or the group $R°CH_2COOCH_2—$; wherein $R°$ is a saturated or unsaturated aliphatic hydrocarbon radical of from 1 to 20 carbon atoms; X is any divalent, or trivalent saturated or unsaturated aliphatic hydrocarbon group of from 1 to 32 carbon atoms; when X is divalent, $a$ is 2 and $b$ is 1, and when X is trivalent, $a$ is 3 and $b$ is 0.

DETAILED DISCUSSION

According to the present invention, there are provided new polymers and resins which, when incorporated in baking enamels, form hard, flexible, adherent films on a substratum, e.g. metals or textiles, after baking for a suitable period of time at a suitable baking temperature, e.g. about 20 minutes at 350°F. When the substratum is a textile, e.g. a natural fiber, a waterproof fabric is obtained.

Generally, the invention contemplates resinous compounds D obtained by reacting with a member of Group A, an oxazoline compound corresponding to the above formula I.

These compounds can be prepared by reacting them with formaldehyde in about a 1:2 mole ratio at a temperature below about 125°C, according to the method of H. L. Wehrmeister, U.S. Pat. No. 3,523,123 which is incorporated herein by reference thereto.

The resinous compounds D are prepared by reacting an oxazoline corresponding to formula I:

1. with formaldehyde and urea in a mole ratio of about 1:3:1 respectively, or
2. with an alkylated urea-formaldehyde resin in a weight ratio of about 1:1 respectively, or
3. with the aforesaid urea-formaldehyde resin in a weight ratio of about 1:1 in the presence of dimethylolpropionic acid (DMPA) in a mole ratio of oxazoline to DMPA of about 1:1.

The reaction for preparing the resinous compounds D is conducted generally by dissolving the components in a suitable solvent, e.g. butanol, and heating at from about 90° to about 110°C under reflux for about 120 minutes, after which time the solvent and water of reaction are removed by distillation. An acidic catalyst, many of which are known, e.g. p-toluene sulfonic acid, can be used when desired. Generally about 0.5 percent of catalyst based on the weight of reactants is sufficient.

The above ratios are not critical and can be varied within rather wide limits without departing from the concepts of the present invention. Generally, however, it is preferred that the amounts of reactants be within about ± 20 percent of the ratios set forth.

Compounds E are resinous compounds obtained by reacting with a member of the Group A compounds an oxazoline corresponding to the above formula III. These compounds are obtained by reacting with an alkylated urea-formaldehyde resin a bis-oxazoline or a tris-oxazoline obtained by the method of A. W. Campbell, et al, U.S. Pat. No. 3,419,520, which is incorporated herein by reference thereto. These compounds are derived by reacting an alkanolamine corresponding to formula II:

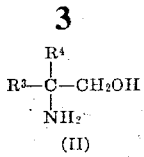

(II)

with a dicarboxylic acid of from 4 to about 36 carbon atoms or with a tri-carboxylic acid of up to about 54 carbon atoms, respectively. $R^3$ and $R^4$ can be methyl, ethyl, or hydroxymethyl and can be the same or different. These alkanolamines include 2-amino-2-ethyl-1,3-propanediol (AEPD), 2-amino-2-methyl-1,3-propanediol (AMPD), 2-amino-2-methyl-1-propanol (AMP), and tris(hydroxymethyl)aminomethane (TA).

There are obtained compounds corresponding to formula III where $a$ is 2 or 3 and $b$ is 1 or 0:

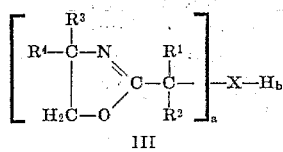

III

Dicarboxylic acids suitable for preparing the compounds of formula III include, but are not limited to, acids of from 4 to 10 carbon atoms, viz., succinic, glutaric, adipic, pimelic, suberic, azelaic, and sebacic. Also the dimer of $C_{18}$ unsaturated fatty acids is a suitable and preferred dicarboxylic acid. Dimerized acids are known to those skilled in the art. They are described in, for example, Technical Bulletin No. 438C, published by Emery Industries, Inc., Cincinnati, Ohio.

The structure of dimer acid, shown schematically below, is essentially that of a long-chain dicarboxylic acid with two or more alkyl side chains ($R_6$ and $R_7$). It appears to contain at least one ethylenic bond. Also within the molecule is the linkage at Z resulting from the polymerization of the two unsaturated fatty acid molecules that form dimer acid. The exact nature of the linkage is undetermined. It may be as simple as a single carbon-to-carbon bond, or as complex as a cyclic-structure. The total number of carbon atoms is 36.

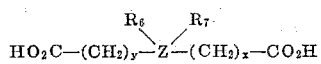

The tricarboxylic acids suitable for preparing the compounds of formula V include the trimer of $C_{18}$ unsaturated fatty acids. This trimerized acid is known to those skilled in the art and is described in the aforementioned Technical Bulletin No. 438C.

While not definitely established, the structure of trimer acid may be represented diagrammatically as shown below. It contains three or more alkyl side chains ($R_6$, $R_7$, $R_8$). Within the molecule, at W, are undetermined linkages resulting from the polymerization of the three unsaturated fatty acid molecules that form trimer acid. The total number of carbon atoms is 54.

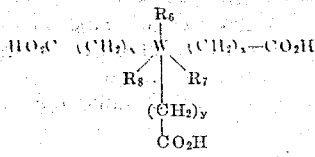

Compounds E are prepared by reacting a bis-oxazoline or a tris-oxazoline corresponding to formula III with an alkylated urea-formaldehyde resin in about a 2:1 weight ratio, when the oxazoline is a tris-oxazoline or about 1:1.2 when the oxazoline is a bis-oxazoline, respectively.

The above ratios are not critical and can be varied within rather wide limits without departing from the concepts of the present invention. Generally, however, it is preferred that the amounts of reactants be within about ± 20 percent of the ratios set forth.

The formaldehyde used in the present invention can be the 37 or 44 percent by weight aqueous solutions of commerce, or it can be provided by paraformaldehyde. Also suitable are the alcoholic solutions of formaldehyde.

The urea and 2,2-dimethylolpropionic acid used in preparing the compounds of the present invention are commercially available and urea the usual commercial grades are suitable. Urea-formaldehyde suitable for the practice of this invention is commercially available and any of the usual commercial grades are satisfactory for use in the present invention. Alkylated, e.g. butylated or di-butylated urea-formaldehyde, which on heating forms an irreversible resin, is preferred. The methylated or propylated products are also suitable.

The foregoing will be better understood with reference to the following examples. It is understood that the examples are presented for the purpose of illustration only, and it is not intended to be limited thereby.

PREPARATION AND PROPERTIES OF COMPOUNDS D

EXAMPLE 1

The following ingredients were charged to a distillation kettle equipped with a stirrer, a reflux condenser and a take-off head:

| | |
|---|---|
| Urea (0.5 mole) | 30 g |
| Formaldehyde (121.5g of 37% solution, 1.5 mole) | 45 |
| 2-[1,1-Bis(hydroxymethyl)ethyl]-4-ethyl-4-propionyloxymethyl-2-oxazoline (0.5 mole) | 136.5 |

The reactants were mixed and slowly heated to reflux with stirring, (about 35 minutes). The temperature was maintained at reflux (about 100°C) for about 2 hours, then water was separated from the reaction mixture by distillation, resulting in final temperature of about 120° ±°C as 66 ml of water are removed. The reaction mixture was diluted to 80 percent solids with methanol and the properties of the solution were determined (Table 1). A 1.5 mil wet film was drawn down on a steel panel and baked for 20 minutes at 350°F, giving a clear film. The properties are given in Table 3.

TABLE 1

PROPERTIES OF POLYMER SOLUTIONS

| Ex. No. | Color* | Viscosity* | Solvent | Solids Content, % |
|---|---|---|---|---|
| 1 | 5 | Y-Z | Methanol | 80 |
| 2 | 5 | $Z_3$-$Z_4$ | — | 100 |
| 3 | 4 | D | Ethoxyethanol | 60 |

*Gardner

TABLE 2

PROPERTIES OF BAKED FILMS

| Example Number | Pencil Hardness* | Reverse Impact, Lb. |
|---|---|---|
| 1 | 9H | 80+ |
| 2 | — | 40+ |
| 3 | 5H | 60 |
| 5 | HB | 80 |
| 6 | 4H | 80+ |
| 7 | B | 80 |

*The order of increasing hardness is B, F, HB, H, 3H, 4H, etc.

EXAMPLES 2-3

Following the general procedure of Example 1, the oxazoline of Example 1 was used to prepare additional resins. In Examples 2 and 3, the oxazoline was reacted with a butylated-urea resin (Beetle 1032 marketed by American Cyanamid Co.). In Example 3, there was included 2,2-dimethylolpropionic acid (DMPA) and 0.1g hydrochloride of 2-amino-2-ethyl-1,3-propanediol catalyst. Further details are listed in Table 3. The properties of the resin solutions obtained therefrom are given in Table 1. A 1.5 mil wet film was drawn down on steel and baked at 350°F for the times shown in Table 3. The baked films were colorless and showed good solvent resistance. Additional properties are given in Table 2.

TABLE 3

| Example No. | 2 | 3 |
|---|---|---|
| Oxazoline, g | 54.6 | 54.6 |
| Oxazoline, moles | 0.2 | 0.2 |
| Butylated urea, g | 45.6 | 45.6 |
| DMPA, g | none | 26.8 |
| DMPA, moles | none | 0.2 |
| Catalyst, g | none | 0.1 |
| Reaction temp., °C | 150-160° | 130° |
| $H_2O$ removed, ml | 16 | 7* |
| Reaction time, min. | 40 | — |
| Film baked, min. | 15 | 20 |

*Includes butanol

EXAMPLE 4

The experiment of Example 2 is repeated in all essential details except that 0.5 mole of 2-[1,1-bis(hydroxymethyl)nonyl]-4-methyl-4-hydroxymethyl-2-oxazoline is substituted for the oxazoline of Example 2. The resulting resinous compound has utility as a vehicle in baking enamels.

PREPARATION AND PROPERTIES OF COMPOUNDS E

EXAMPLE 5

A tris-oxazolinyl compound corresponding to formula III was prepared by mixing 259g, about 0.8 mole, of trimerized fatty acid (Empol 1,040 manufactured by Emery Industries, Inc., was used) with 85.4g, about 0.95 mole, of 2-amino-2-methyl-1-propanol. The mixture was then heated to 170°-175°C with stirring until the avid value was > 10. Water of reaction was separated in the take-off head. The total reaction time was about 5 hours and the final acid value was 4.9.

A baking enamel was prepared using the following ingredients:

| | |
|---|---|
| Tris-oxazoline | 50g |
| Butylated urea resin | 25 |
| Ferric oxide pigment | 73.5 |
| Talc | 34.8 |
| Calcium carbonate | 34.8 |
| Xylene | 36.0 |
| p-Toluene sulfonic acid catalyst | 0.28 |
| 24% Lead drier | .48 |
| 6% Cobalt drier | .48 |

The above was drawn on a steel panel and baked at 350°F for 20 minutes. The properties are given in Table 2.

EXAMPLE 6

A bis-oxazoline compound corresponding to formula III was prepared by mixing 306g, about 1 mole, of dimerized $C_{18}$ fatty acids with 119g, 1 mole of 2-amino-2-ethyl-1,3-propanediol, heating to 180°-185°C with stirring until the acid value was less than 5. The resulting product had a color, Gardner, of 14, a viscosity at 100 percent by wt. of $Z_{9+}$, and an acid value of 3.2.

This oxazoline was incorporated into the baking enamel formula, given below, which was drawn down on standard Q steel panels at 1.5 mil and baked for 20 minutes, 350°F, to form in situ the resin which acts as the binder in this formulation. The properties of the baked film are given in Table 2.

| | Ex. 23 |
|---|---|
| Oxazoline | 55.0g |
| Butylated urea resin | 67.2 |
| Ferric oxide | 73.5 |
| Calcium carbonate | 34.8 |
| Talc | 34.8 |
| Xylene | 36.0 |
| p-Toluene sulfonic acid | 0.14 |
| 24% Lead drier | 0.48 |
| 6% Cobalt drier | 0.48 |

EXAMPLE 7

A mixture of mono-oxazoline, bis-oxazoline and tris-oxazoline corresponding to formula III were prepared by mixing 153g (0.25 mole) of dimerized $C_{18}$ fatty acid (which consisted of 75 percent of the dimer, 22 percent of the trimer and 3 percent of monobasic acids) with 44.6g (0.5 mole) of 2-amino-2-methyl-1-propanol.

The reactants were mixed in a flask equipped with stirrer, thermometer and nitrogen sparge. The temperature was raised to 180°-185°C and maintained until the acid value was less than 10. The resulting oxazoline mixture was incorporated into the baking enamel formula given below, which was then sprayed on a standard Q steel panel at 1.5 mil thickness and baked at 350°F for 20 minutes to form in situ the resin which acts as the binder in this formulation. The properties of the baked film are given in Table 2.

| | |
|---|---|
| Mixed oxazolines | 53.25g |
| Butylated urea-formaldehyde | 39.00 |
| Ferric oxide | 73.5 |
| Talc | 34.8 |
| Calcium carbonate | 34.8 |
| Xylene | 36.0 |
| p-Toluene sulfonic acid | 0.28 |
| 24% Lead drier | 0.48 |
| 6% Cobalt drier | 0.48 |

EXAMPLE 8

A tris-oxazoline corresponding to formula V was prepared by mixing 119.1g (1 mole) of 2-amino-2-ethyl-1,3-propanediol with 259.3g of trimerized $C_{17}$ fatty acids (about 0.78 mole) and heating to 180°–185°C until the acid number was less than 5. The resulting product had a color of 8 and a viscosity, 100 percent of $Z_0$–$Z_7$.

The tris-oxazoline was incorporated into the following formula and drawn down on a standard Q panel at 1.5 mil thickness. The panel was then baked to form the in situ polymer which acts as the binder for this formulations. The properties of the baked film are given in Table 2.

|  | Ex. 28 |
|---|---|
| Tris-oxazoline | 51.3g |
| Butylated urea resin | 70.2 |
| Ferric oxide | 73.5 |
| Calcium carbonate | 34.8 |
| Talc | 34.8 |
| Xylene | 36.0 |
| p-Toluene sulfonic acid | 0.14 |
| 24% Lead drier | .48 |
| 6% Cobalt drier | .48 |

I claim:

1. A resinous compound consisting of the condensation product of (a) an oxazoline compound corresponding to the formula

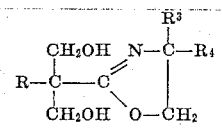

wherein R is a saturated or unsaturated hydrocarbon radical of from 1 to 20 carbon atoms or (b) an oxazoline corresponding to the formula

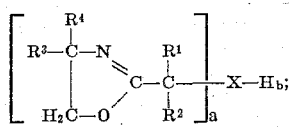

wherein X is any divalent, or trivalent saturated or unsaturated aliphatic hydrocarbon group of from 1 to 32 carbon atoms; $R^1$ and $R^2$ are hydroxymethyl; $R^3$ and $R^4$ are methyl, ethyl, hydroxymethyl or the group $R°CH_2COOCH_2$— wherein $R°$ is a saturated or unsaturated aliphatic hydrocarbon radical of from 1 to 20 carbon atoms; when X is divalent, $a$ is 2 and $b$ is 1, and when X is trivalent, $a$ is 3 and $b$ is 0, with (1) formaldehyde and urea, or (2) alkylated urea-formaldehyde resin, or (3) mixtures of alkylated urea-formaldehyde resin and 2,2-dimethylolpropionic acid.

2. A resinous compound consisting of the condensation product of an oxazoline compound corresponding to the formula

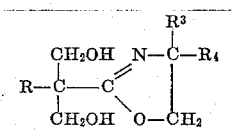

wherein R is a saturated or unsaturated hydrocarbon radical of from 1 to 20 carbon atoms; $R^3$ and $R^4$ are methyl, ethyl, hydroxymethyl or the acyloxymethyl group $RCH_2COOCH_2$—, with (1) formaldehyde and urea or (2) an alkylated urea-formaldehyde resin, or (3) an alkylated urea-formaldehyde resin and 2,2-dimethylolpropionic acid.

3. The compounds of claim 2 wherein $R^3$ and $R^4$ of said oxazoline compounds are methyl groups.

4. The compounds of claim 2 wherein $R^3$ and $R^4$ of said oxazoline compound are hydroxymethyl groups.

5. The compounds of claim 2 wherein $R^3$ and $R^4$ of said oxazoline compound are represented by the formula $RCH_2COOCH_2$—.

6. The compounds of claim 2 wherein $R^3$ is of said oxazoline compound methyl or ethyl and $R^4$ is represented by the formula $RCH_2COOCH_2$—.

7. The resinous compounds of claim 2 obtained by condensing the said oxazoline compound with formaldehyde and urea.

8. The resinous compounds of claim 2 obtained by condensing the said oxazoline compound with a butylated urea-formaldehyde resin.

9. The resinous compounds of claim 2 obtained by condensing the said oxazoline compound with a butylated urea-formaldehyde resin and 2,2-dimethylolpropionic acid.

10. A resinous compound consisting of the condensation product of an alkylated urea-formaldehyde resin, with an oxazoline compound corresponding to the formula

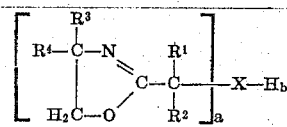

wherein $R^1$ and $R^2$ are hydroxymethyl; $R^3$ and $R^4$ are methyl, ethyl, hydroxymethyl or the group $R°CH_2COOCH_2$—; wherein $R°$ is a saturated or unsaturated aliphatic hydrocarbon radical of from 1 to 20 carbon atoms; X is any divalent, or trivalent saturated or unsaturated aliphatic hydrocarbon of from 1 to 32 carbon atoms; when X is divalent, $a$ is 2, and $b$ is 1, and when X is trivalent, $a$ is 3, and $b$ is 0.

11. The compounds of claim 10 wherein $R^3$ and $R^4$ of said oxazoline compound are methyl groups.

12. The compounds of claim 10 wherein $R^3$ and $R^4$ of said oxazoline compound are hydroxymethyl groups.

13. The compounds of claim 10 wherein X is divalent.

14. The compounds of claim 10 wherein X is trivalent.

* * * * *

UNITED STATES PATENT OFFICE
CERTIFICATE OF CORRECTION

Patent No. 3,843,607          Dated October 22, 1974

Inventor(s) Jerry H. Hunsucker

It is certified that error appears in the above-identified patent and that said Letters Patent are hereby corrected as shown below:

Column 3, the formula at lies 62 and following should appear as follows:

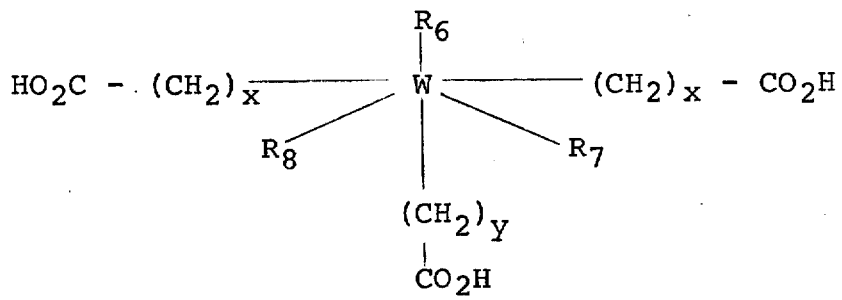

Column 5, line 63, "avid" should read --acid--

Signed and Sealed this thirteenth Day of April 1976

[SEAL]

Attest:

RUTH C. MASON  
Attesting Officer

C. MARSHALL DANN  
Commissioner of Patents and Trademarks